No. 613,197. Patented Oct. 25, 1898.
C. S. GOODING & V. BEAUREGARD.
MACHINE FOR CUTTING BOOT OR SHOE SOLES, &c.
(Application filed Nov. 15, 1897.)
(No Model.)
6 Sheets—Sheet 1.
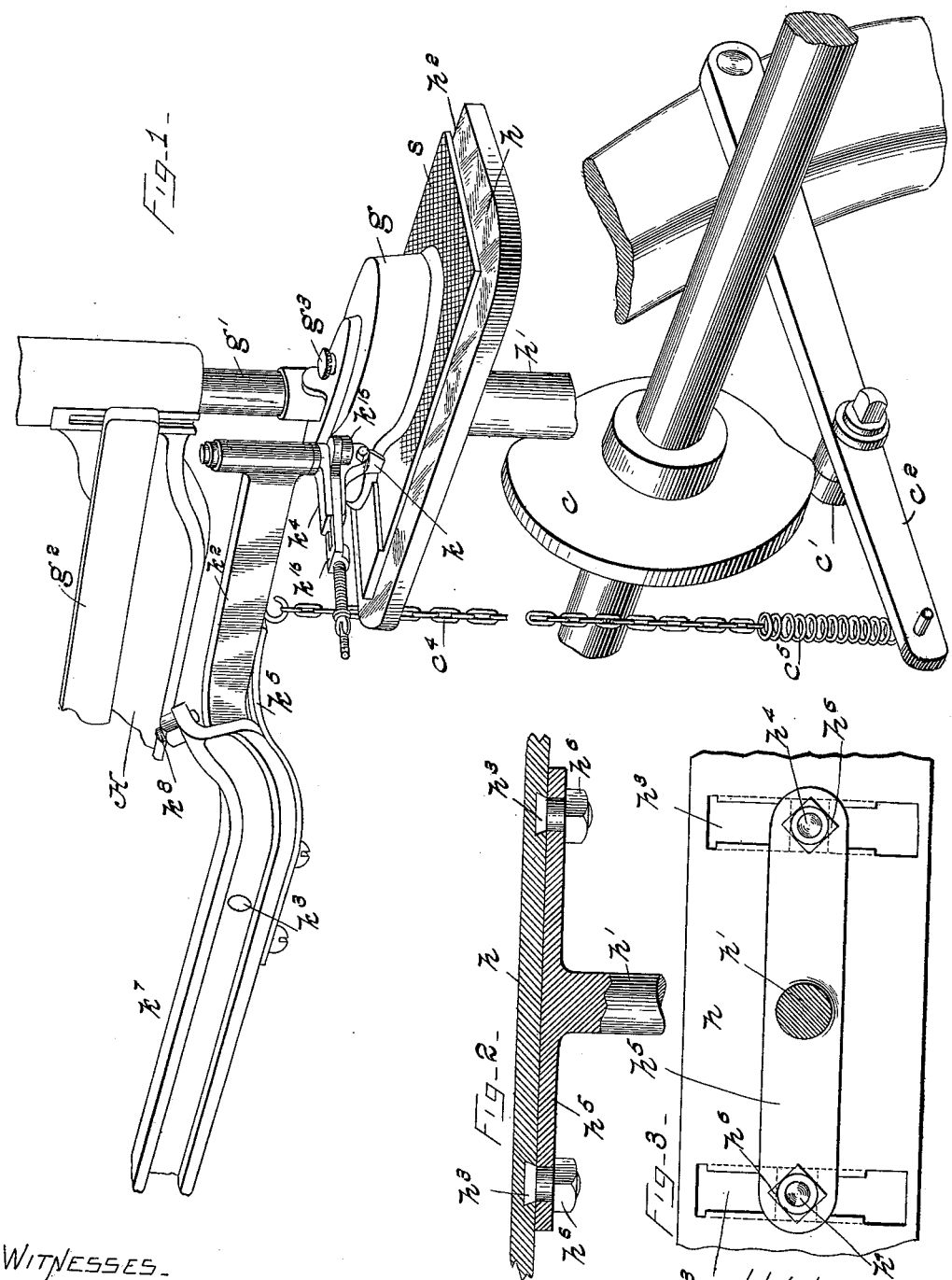
WITNESSES
Reuben L. Roberts.
Thomas J. Cunningham.
INVENTORS
Chas. S. Gooding.
Victor Beauregard

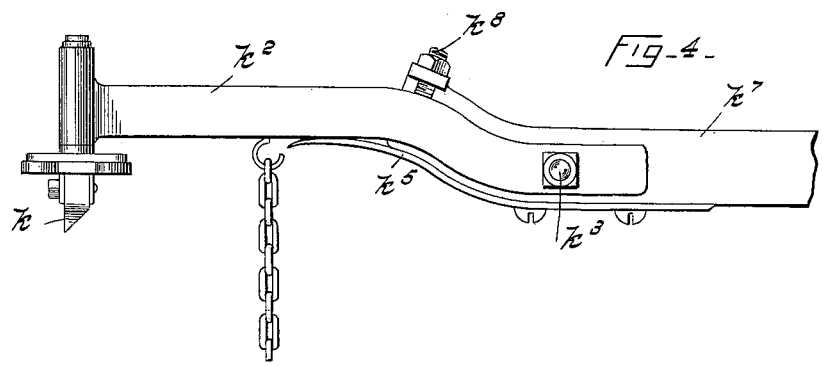
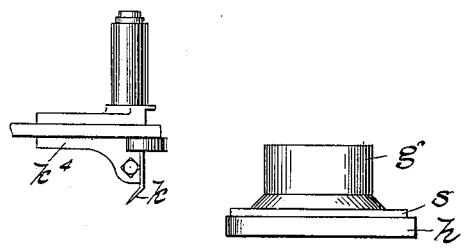
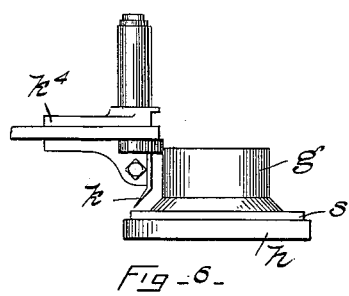
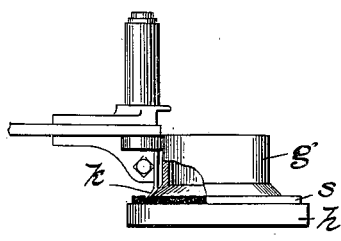
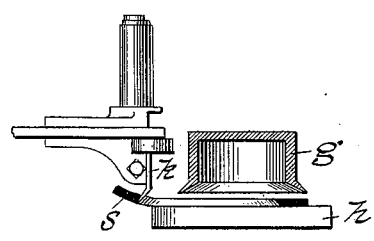

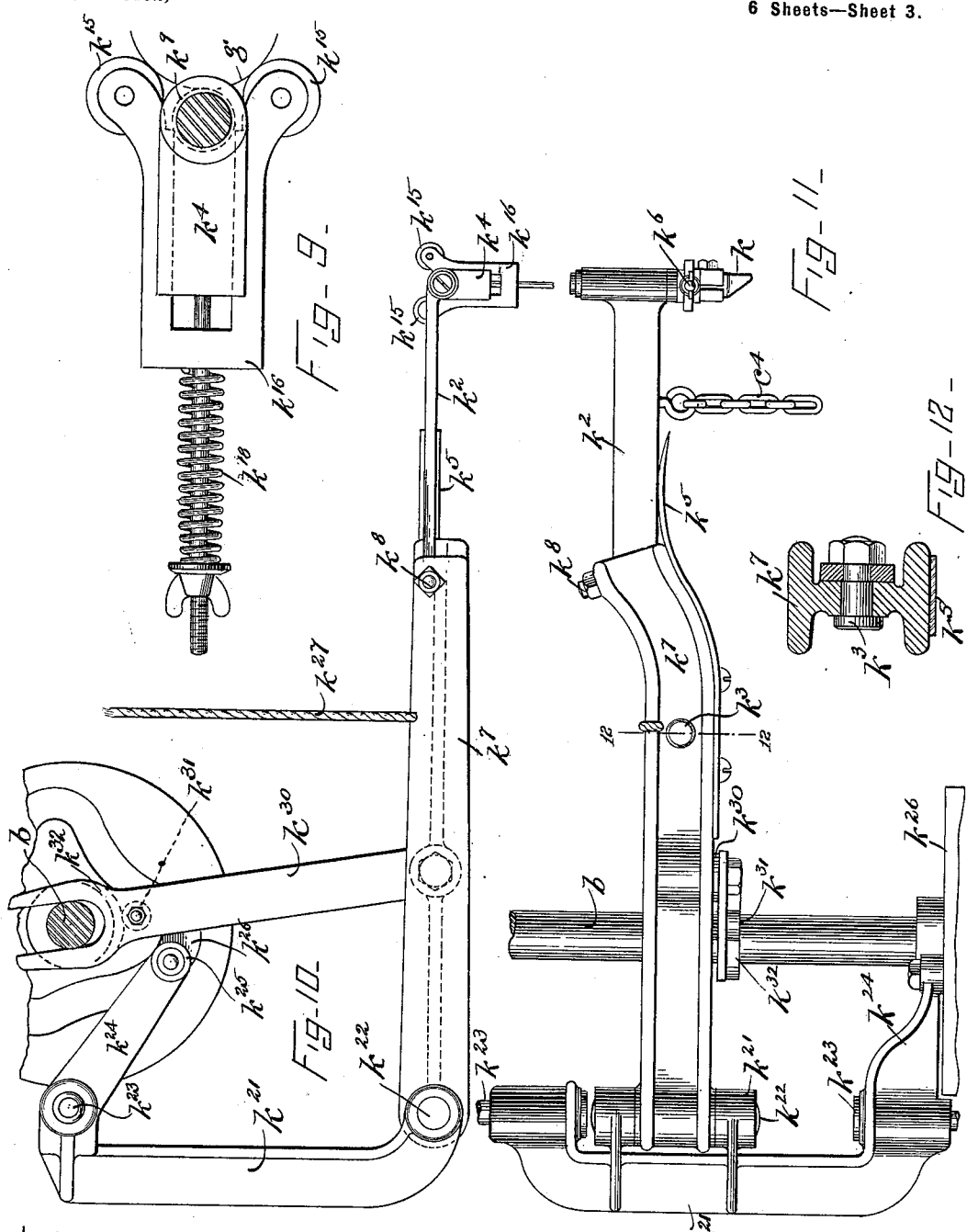

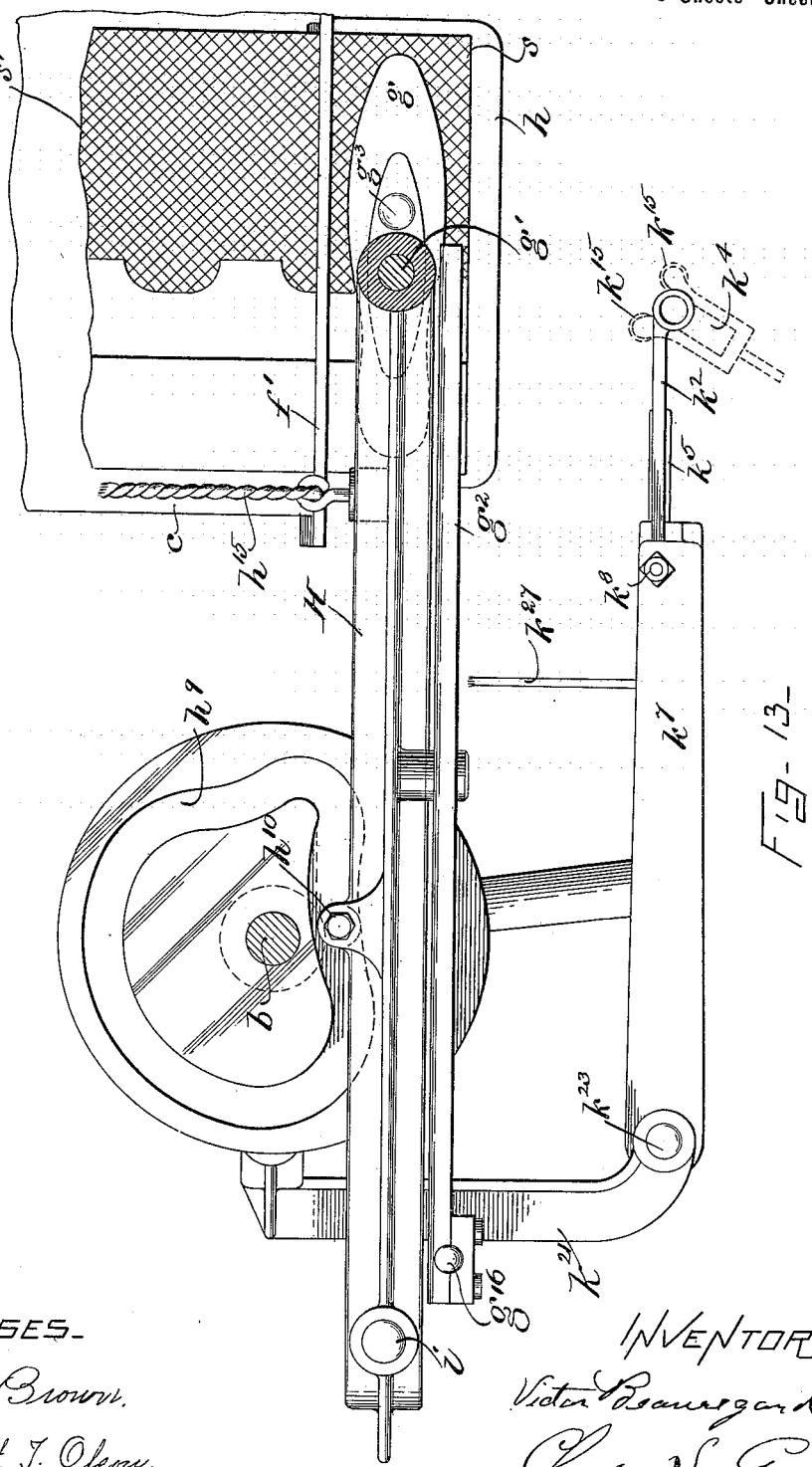

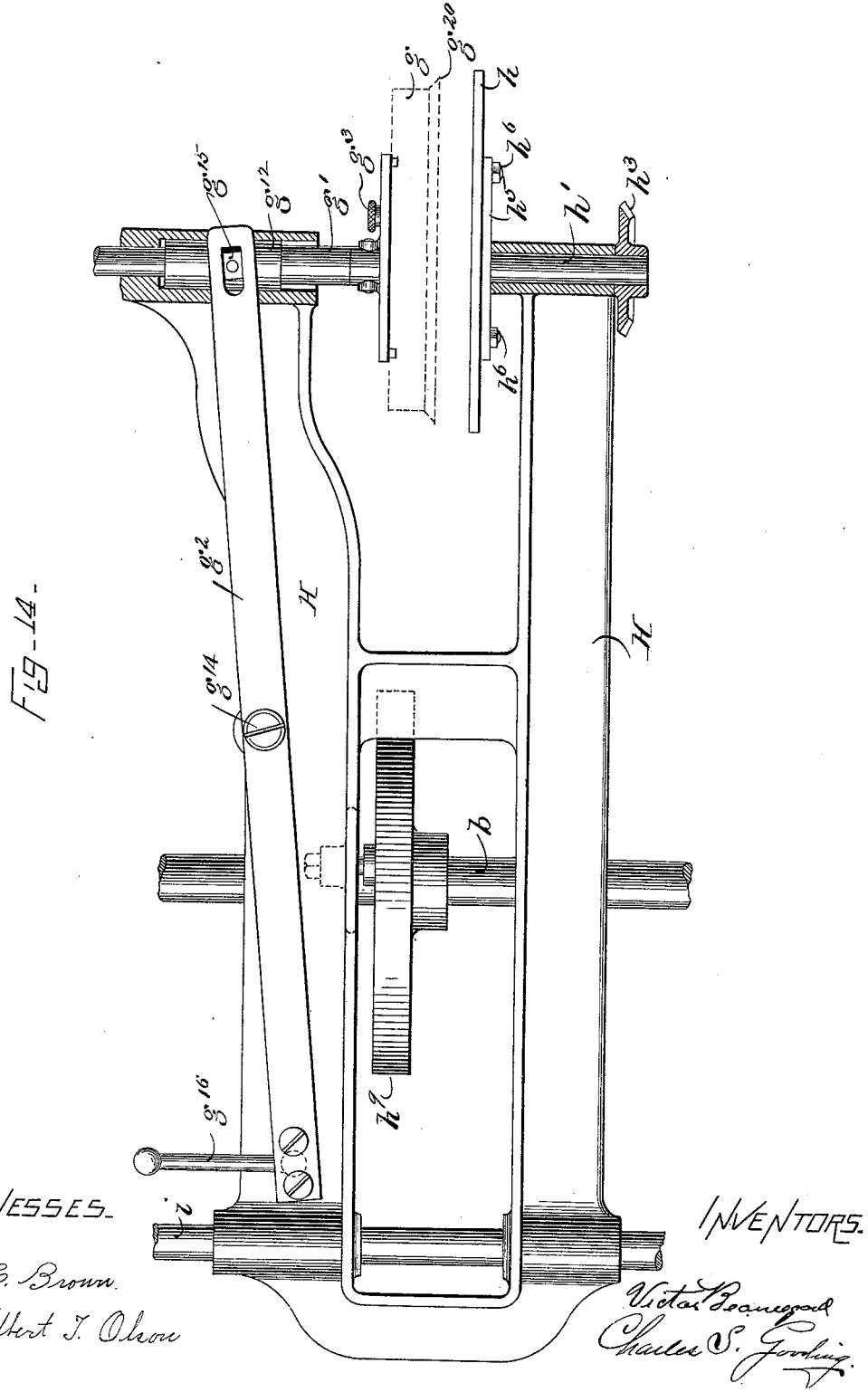

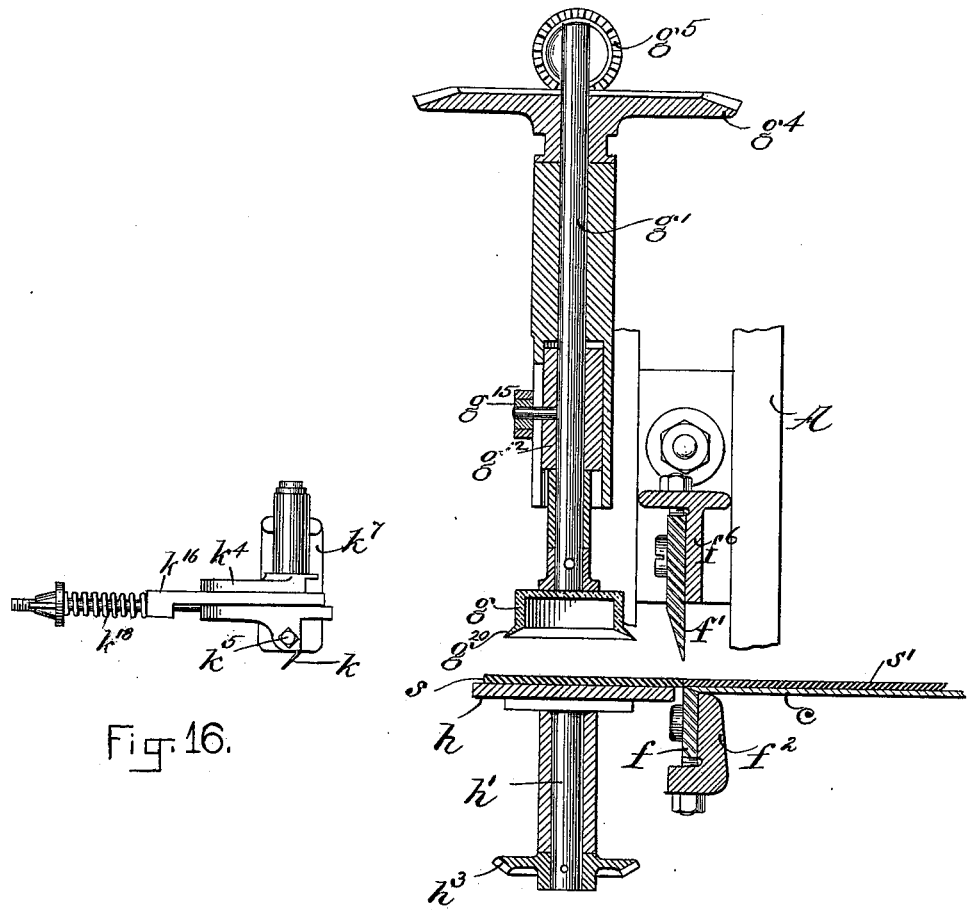

UNITED STATES PATENT OFFICE.

CHARLES S. GOODING, OF BROOKLINE, AND VICTOR BEAUREGARD, OF BOSTON, MASSACHUSETTS, ASSIGNORS TO ROBERT D. EVANS AND JOHN S. LOCKWOOD, OF BOSTON, MASSACHUSETTS.

MACHINE FOR CUTTING BOOT OR SHOE SOLES, &c.

SPECIFICATION forming part of Letters Patent No. 613,197, dated October 25, 1898.

Application filed November 15, 1897. Serial No. 658,586. (No model.)

*To all whom it may concern:*

Be it known that we, CHARLES S. GOODING, of Brookline, in the county of Norfolk, and VICTOR BEAUREGARD, of Boston, in the county of Suffolk, Commonwealth of Massachusetts, have invented certain new and useful Improvements in Machines for Cutting Boot or Shoe Soles and other Articles of Curvilinear Outline, of which the following description is a specification.

The invention relates to certain improvements upon the machine described and shown in the specification and drawings accompanying Letters Patent No. 593,537, dated November 9, 1897, to which reference is made for details of the machine; and it consists in improvements in the mechanism for manipulating the trimming-knife and in the support for the material which is to be cut.

The invention will be readily understood from the description hereinafter contained and the references to the accompanying drawings, in which—

Figure 1 is a perspective view of detached portions of the machine, showing the support and clamp for the material and the knife supporting and operating mechanism, the position of the latter in relation to the support and clamp being ignored in order to condense the drawings. Fig. 2 is a longitudinal vertical section of a portion of the adjustable support for the material. Fig. 3 is a plan of the same portion viewed from the under side. Fig. 4 is a side elevation of the knife and its supporting-arm in the normal position. Fig. 5 shows the knife separated from the clamping-pattern. Fig. 6 shows the clamping-pattern with the trimming-knife-guide roll just brought into contact therewith. Fig. 7 shows the knife thrust through the material and in proper position to trim it in accordance with the outline of the pattern. Fig. 8 shows the clamping-pattern raised from the material after the trimming operation and the scrap and cut sole being pulled from the support by the trimming-knife as the support and clamping-pattern are being swung back to the blank-cutting shears to receive a fresh blank. Fig. 9 is a plan view of the knife-holder with its spring-controlled sliding plate and guide-rolls. Fig. 10 is a plan view of the arm for supporting and carrying the trimming-knife holder and of the mechanism for actuating said arm. Fig. 11 is a side elevation of the same parts. Fig. 12 is a vertical section of the said arm on line 12 12 in Fig. 11. Fig. 13 is a plan view of the support for the material, the clamp and clamp-supporting arm, and mechanism for actuating said arm and the trimming-knife-supporting arm. Fig. 14 is a side elevation of the blank-support and clamp in broken lines and the double arm which sustains them and the cam by which the said arm is operated. Fig. 15 is a vertical section through the cutting-shears, the blank-support and clamp, and their supporting parts of the machine. Fig. 16 is a side elevation of the trimming-knife and its support located in the position relatively to the clamp which it should occupy when its guide-rolls are not in contact therewith.

Referring to the drawings, H is a double-armed frame which is swung upon a pivot $i$ by means of a cam $h^9$, engaged by a cam-roll $h^{10}$, the upper arm of which frame supports the clamping-pattern $g$, this pattern being turned through power connection with the gears $g^4$ $g^5$ and shaft $g'$, to which the pattern is attached, and the lower arm of which carries the support $h$, turned by the shaft $h'$ and gear $h^2$.

$s$ is a blank which has been cut from the strip of material $s'$ and is held upon the support $h$ by the clamp $g$.

$g'$ is a shaft which supports the pattern $g$. $g^2$ is a lever attached to the sleeve upon said shaft $g'$, by which it is raised and lowered, and with it the clamp $g$, to which it is attached by a screw $g^3$.

The blank-support $h$ has a straight side $h^2$, which is the one always presented to the end of the feeding-table when the material is to be fed forward onto this support and a blank cut. The width of the support $h$ is in excess of the width of the widest blank needed, and as it is necessary to cut blanks of different width for different sizes or styles of soles instead of using a different support for the different sizes the support $h$ is made adjustable upon its supporting-shaft $h'$ in a lateral direction—that is, at right angles to its straight side $h^2$. This is accomplished by providing dovetailed grooves $h^3$ in the under side of said support in which the dovetailed ends of bolts $h^4$ fit and may slide. The shanks of these bolts pass through holes in a supporting-arm $h^5$ on the upper end of the shaft $h'$ and are held fast by nuts $h^6$. It will readily be seen that by loosening the nuts $h^6$ the support $h$ may be moved in or out upon the arm $h^5$ the distance needed to meet the requirements of the different sizes or shapes of soles to be cut instead of being obliged to apply a different supporting-form for the different sizes of soles, as in the machine described in the patent hereinbefore referred to.

It will be understood that before the material is brought to the trimming-machine the designating or ornamental figures are embossed thereon by the calendering-rolls at approximately proper distances apart for the width of sole required, and by reason of the adjustability of the support the only change of form or pattern needed to be made for different sizes or styles of soles is in the clamp $g$.

$k$ is the trimming-knife, clamped in the holder $k^4$ by the screw $k^6$, the said holder being supported by an arm $k^7$, which is pivoted at $k^{22}$ to a swinging bracket $k^{21}$, the outer end of the arm $k^7$ being caused to oscillate toward and from the clamp $g$ by means of the forked arm $k^{30}$, which is operated by an attached roll $k^{31}$, having a bearing upon a cam $k^{32}$ on the shaft $b$, and the arm $k^{24}$, which is integral with the bracket $k^{21}$ and bears a roll $k^{25}$, which engages a cam-groove $k^{26}$. The knife-holder $k^4$ is made automatically adjustable to the varying curves of the clamping-pattern $g$ by means of the spring-controlled sliding plate $k^{16}$ and the gage-roll $k^9$ and guide-rolls $k^{15}$. The knife-holder is supported at the end of a short lever $k^2$, pivoted to the arm $k^7$ at $k^3$. A spring $k^5$ is fastened to the arm $k^7$ and its outer end bears upon the under side of the lever $k^2$ and normally forces it up against the stop-screw $k^8$. When the knife is in its normal raised position with the lever $k^2$ pressed up against the stop-screw $k^3$, the arm $k^7$, and with it the knife, is swung toward the clamp $g$ until the guide-rolls of the knife-holder come to a bearing upon the side of said clamp. At this moment the lever $k^2$ is pulled down and the trimming-knife thrust through the material by means of a cam $c$, which acts upon a cam-roll $c'$, held in a lever $c^2$, one end of which is pivoted to the frame of the machine and the other end is connected to the lever $k^2$ by a chain or cord $c^4$, and for the purpose of producing a yielding pressure of the trimming-knife upon the support $h$ a spring $c^5$ is interposed in the connection between the levers $c^2$ and $k^2$. The shape of the cam $c$ is such as to hold the knife in the depressed position with its point touching the support $h$, during the time of one revolution of that support and the clamp $g$. Then the cam releases the lever $c^2$ and permits the spring $k^5$ to raise the lever $k^2$, with the knife $k$, to its normal position. At this time the clamp $g$ is raised from the material and with the support $h$ is moved toward the blank-cutting shears, while the point of the knife $k$, still being beneath the material, will pull it from the support and drop it upon a conveying-belt provided for its removal. This improved construction will be found of great practical benefit in the operation of the machine, as the knife does not enter the material until it is near to the clamp, where the material is firmly held and there passes through by a downward thrust, which precludes any liability to push the soft material before it, which would tend to cause the edge of the material to be unevenly cut.

The blank-support, besides being made adjustable to accommodate soles or other articles of different sizes and styles, is by reason of its straight side also adapted to be carried close up to the line of cut of the blank-cutting shears $f f'$, Fig. 15, so that no substantial open space is left in which the end of the material might catch as it is fed forward onto the support. Likewise the upper surface of this support is made of extremely-hard material, such as hardened steel, thus preventing the knife from scratching or marring it when the support is rotated.

We claim—

1. In a machine for cutting articles of curvilinear outline, a support for the material to be cut, a pattern-clamp to hold the material thereon, and determine the shape of the article, a knife held in a swiveling support which is adapted to bear upon and follow the edge of said clamp, a spring to hold the said knife normally out of contact with the material and means to automatically force it through the material after the knife-support makes contact with the clamp.

2. In a machine for cutting articles of curvilinear outline, a support for the material to be cut, a pattern-clamp to hold the material thereon and determine the outline of the article cut, a pivoted knife-holder which is adapted to bear upon and follow the varying curves of the edge of said clamp, a knife carried in said holder normally out of contact with the material and mechanism to force the knife through the material after its holder has made contact with the clamp and to hold it with yielding pressure upon the support beneath during the cutting operation.

3. In a machine for cutting articles of curvilinear outline, a support for the material to be cut, a pattern-clamp to hold the material thereon and determine the outline of the article, a knife carried by a swiveling holder which is adapted to bear upon and follow the varying curves of the edge of said clamp, a pivoted arm capable of vertical movement, which sustains said holder, means to raise said arm and keep the knife normally out of contact with the material, and a cam to force the knife through the material and hold it to its work during the operation of cutting the article in conformity to said clamp.

4. In a machine for cutting articles of curvilinear outline by pattern, a blank-support having an unyielding surface relatively harder than the trimming-knife; a clamping-pattern to hold the material thereon and determine the outline of the article to be cut; a trimming-knife supported in a swiveling holder and held normally in a plane above the surface of the material, and mechanism to force the knife through the material and cause it to bear upon the surface of the support beneath with yielding pressure, during the cutting operation.

5. In a machine for cutting articles of curvilinear outline, which is provided with blank-cutting shears; a revolving blank-support which is of greater surface area than the article to be cut, a revolving pattern-clamp to hold the blank upon said support; mechanism to move said support and clamp toward and from the cutting-shears, and devices to adjust said support at right angles to its longest dimension and in a horizontal plane, to vary the distance between the sides of said support and the center on which it revolves.

CHAS. S. GOODING.
VICTOR BEAUREGARD.

Witnesses:
REUBEN L. ROBERTS,
THOMAS J. CUNNINGHAM.